M. S. BROWN.
GEARING.
APPLICATION FILED NOV. 24, 1914.
1,230,661.
Patented June 19, 1917.
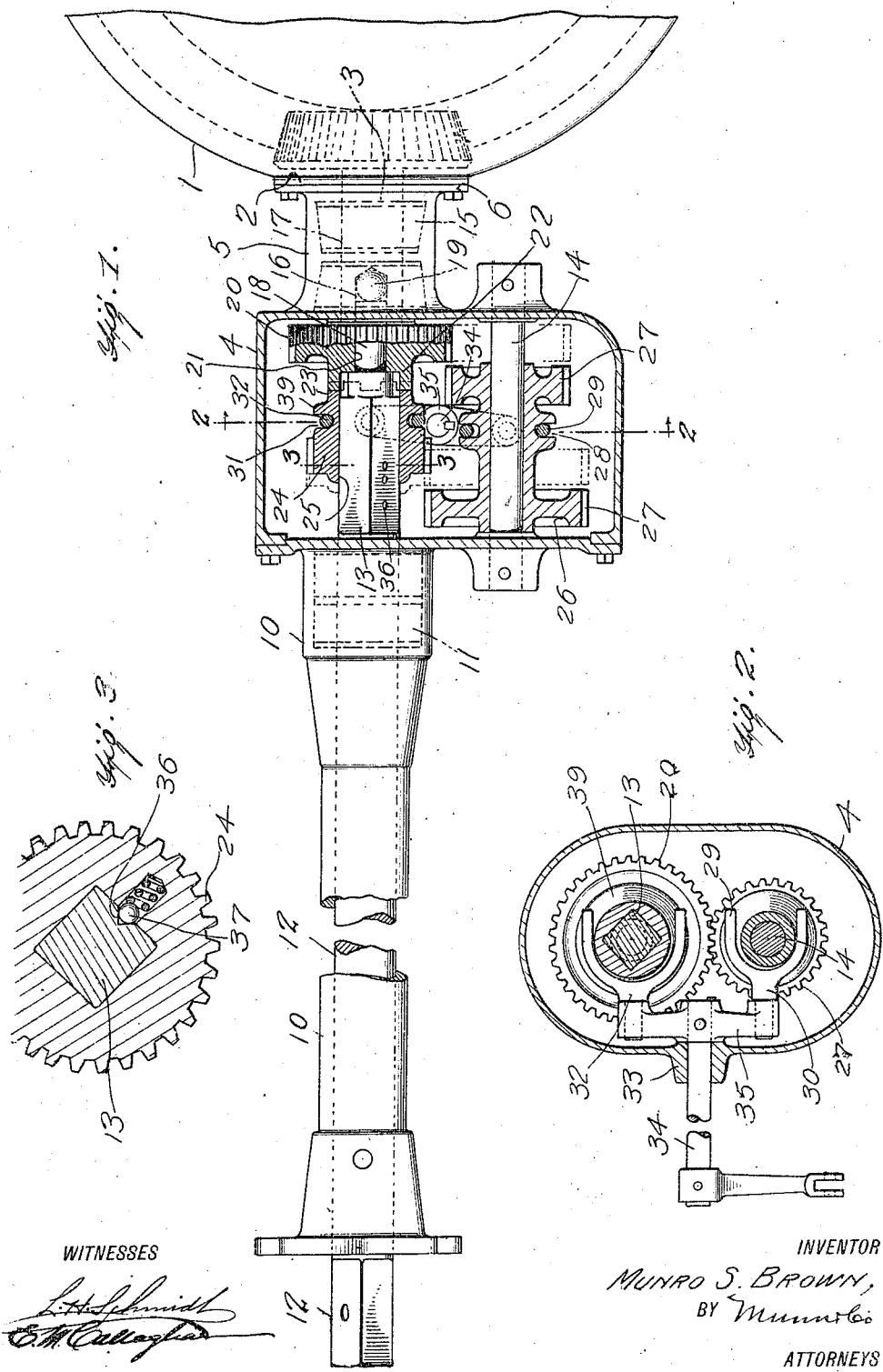
WITNESSES
INVENTOR
MUNRO S. BROWN,
BY
ATTORNEYS

UNITED STATES PATENT OFFICE.

MUNRO S. BROWN, OF GOLDFIELD, NEVADA.

GEARING.

1,230,661.  Specification of Letters Patent.  Patented June 19, 1917.

Application filed November 24, 1914. Serial No. 873,709.

*To all whom it may concern:*

Be it known that I, MUNRO S. BROWN, a citizen of the United States, and a resident of Goldfield, in the county of Esmeralda and State of Nevada, have invented a new and useful Improvement in Gearing, of which the following is a specification.

This invention is an improvement in gearing particularly designed for Ford automobiles and relates more particularly to a transmission mechanism to be used in connection with automobiles which are already equipped with means for driving the rear axle at two or more speeds.

An object of the present invention is to provide an auxiliary gearing to be used in connection with the ordinary transmission gearing of an automobile whereby the number of speeds at which the car may be driven is multiplied two-fold.

As before suggested a further object is to provide an auxiliary gearing especially adapted for use in connection with the Ford automobile having two forward speeds so arranged that the driving shaft leading from the vehicle transmission gearing may drive the rear axle either directly or through the intervention of a gear mechanism, thus providing the vehicle with four forward speeds.

A further object is to provide a gearing for use in connection with automobiles and attachable to the rear axle casing containing the differential, whereby the drive shaft may be directly connected to the follower shaft which drives the drive shaft of the differential through connecting gears, may rotate independent thereof or may be connected thereto by gearing to change the speed.

A further object is to attain the beforementioned ends in a novel and expeditious manner and with these and other objects in view which will appear as the description proceeds, the invention resides in the combination and arrangements of parts and in the details of construction hereinafter described and claimed, it being understood that changes in the precise embodiment of the invention can be made within the scope of what is claimed without departing from the spirit of the invention.

In the drawings accompanying this specification and forming a part thereof, the preferred embodiment of my invention is illustrated, in which:—

Figure 1 is a top view in section of the transmission gearing, and coöperating parts of the differential to which it may be attached.

Fig. 2 is a cross sectional view taken on the line 2—2 of Fig. 1 and

Fig. 3 is a cross sectional view taken on the line 3—3 of Fig. 1.

Referring to the drawings in which similar reference numerals designate corresponding parts, a rear axle casing 1 inclosing a differential, is provided with the usual collar 2, and drive shaft 3, journaled therein.

A casing 4 is provided with the off-set neck 5, and terminal collar or flange 6, which is bolted to the flange or collar 2, and thus may be attached to any vehicle already in use, and readily detached therefrom should it be so desired.

Extending outward from and in substantial alinement with the neck 5 is the housing 10, in which is located the bearing 11, rotatably receiving the drive shaft 12 which extends within the casing, and is provided with the squared or polygonal end 13. The drive shaft and the housing 10 therefor is extended outwardly as shown in the drawing, the front end of the drive shaft being adapted for connection with the universal joint from the transmission mechanism.

A jack shaft or axle 14 is rigidly disposed within the casing and extends parallel to the drive shaft 12 and follower shaft 3, it being noted in this connection that the follower shaft is journaled within a bearing 15 carried by the casing neck.

The follower shaft is provided with the longitudinal opening 16 extending inwardly from its end 17, in which is journaled the reduced extremity 18 of the drive shaft. A thrust bearing is established between the drive and follower shafts, and is effected by the ball 19 positioned within the opening 16 against which the drive shaft extremity 18 bears.

A gear 20 is located within the casing and rigidly secured to or formed as a part of the follower shaft 3, and is provided with the opening 21, through which the reduced extremity 18 of the drive shaft rotatably extends. The exposed face of the gear is formed as or carries the clutch member 22, with which the clutch member 23 coacts, the latter being formed as a part of or carried by the sliding gear 24. The gear 24 is provided with a polygonal opening 25, which non-rotatably but slidably receives the extremity 13 of the drive shaft. Thus as the drive shaft is rotated a corresponding motion will be imparted to the sliding gear and clutch 24—23 to thus forcibly rotate the follower shaft 3, provided the clutch members are in engagement.

A sliding member 26 is rotatably mounted upon the jack shaft 14 and includes the connected gears 27 of different size, which are adapted to mesh with and engage the gears 20—24 when moved therebeneath. In order to move the sliding member 26 into position with the gears meshing with those of the drive and follower shafts, it is provided with the groove 28, in which the prongs 29 of the fork 30 extend. A somewhat similar arrangement is provided for the shifting of the clutch-gear 23—24, the same constituting a groove 31 and pronged fork 32.

The wall of the casing 4 is provided with the boss 33, through which the controller shaft 34 extends, to which latter the lever 35 is secured. The lever 35 carries at its remote extremities the forks 30—32 and effects a pivotal connection therewith so that as the rocking controller shaft 34 is oscillated, the clutch-gear 23—24 and sliding member 26 will be moved in reverse directions.

The arrangement and extent of the various parts is such that pre-supposing the clutch in engagement as depicted in Fig. 1, in which the drive shaft 13 is directly and positively connected to the follower shaft 3, a rocking of the controller shaft 34 will draw the clutch members out of engagement, allowing the drive shaft 12 to rotate independently of the follower shaft which position is of particular advantage during the starting of the engine and the actuation of the main gearing so that the same will become lubricated and in a condition to properly transmit power to the rear axle of the vehicle.

A further movement of the controller shaft 34 brings the gears 24 and 27 into mesh with the result that motion will be imparted to the follower shaft at a decidedly reduced speed. The shaft extremity 13 is provided with the three spaced openings or depressions 36, with which the spring pressed member 37 carried by the gear 24 is adapted to coact and resiliently lock the parts in the three above-mentioned positions.

As before stated the attachment is especially adapted to be used with the Ford automobile and is designed to take the place of the propeller shaft and the propeller shaft housing of said automobile.

From the foregoing it will be apparent that the auxiliary transmission gearing as thus disclosed may be readily secured to a rear axle casing inclosing the differential of the ordinary type and thus constitutes an attachment therefor, and is adapted to multiply by two-fold the speeds as represented by the speeds at which the drive shaft 12 may be driven. With this attachment the gears can be placed in the neutral position wherein the drive shaft 12 may rotate independent of the follower shaft and the drive shaft will be free to turn until the engine warms up.

Having thus described my invention, what I claim is:—

1. An attachment for motor vehicles comprising a casing having an offset neck, means for securing the neck to the rear axle casing inclosing the differential, a drive shaft housing extending forward from said casing in line with said neck, a bearing in said housing adjacent the casing, a drive shaft journaled in said bearing and extending into said casing, a bearing carried by the casing neck, a follower shaft leading from the casing and journaled in said bearing in the casing neck, the follower shaft being adapted for connection to the differential, and coöperating means disposed within said casing engaging said drive and follower shafts for the transmission of motion at various speeds therebetween, and allowing for the free rotation of said drive shaft.

2. An attachment for motor vehicles, comprising a casing having an offset neck for detachable connection with the rear axle casing inclosing the differential, a drive shaft housing extending forward from said casing in line with said neck, a drive shaft journaled in said housing and extending into the casing, the drive shaft being provided with a reduced extremity, a follower shaft journaled in the neck of the casing and adapted for connection with the differential, the follower shaft being provided with a bored extremity receiving the drive shaft reduced extremity therein and effecting a thrust bearing therewith, a gear carried by said follower shaft, a clutch carried by said gear, a gear slidable and non-rotatably mounted upon said drive shaft, a clutch carried thereby, a jack shaft, connected gears rotatably and slidably mounted upon said jack shaft adapted to mesh with the gear on the drive shaft and the gear on the follower shaft for the transmission of motion between said drive and follower shaft gears, and means for moving said jack shaft connected gears and said drive shaft gear for the direct transmission of motion between said drive and follower shafts for the independent rotation of said drive shaft and for the transmission of motion between the said drive and follower shafts through said gears to vary the speed, and means for locking the drive shaft and its gear together to hold the shifting parts in their several positions.

3. An attachment for motor vehicles, comprising a casing having a neck projecting therefrom, means for detachably connecting the casing neck with the differential gear casing of a vehicle, a drive shaft housing extending from said casing in line with said neck, a bearing in said housing, a drive shaft journaled in said bearing and extending into the casing, the drive shaft being provided with a reduced extremity, a bearing in the neck of said casing, a follower shaft journaled in said bearing and adapted for connection with the differential, the follower shaft being provided with a bored extremity receiving the drive shaft reduced extremity therein and effecting a thrust bearing therewith, a gear carried by said follower shaft, a clutch carried by said gear, a gear slidably and non-rotatably mounted upon said drive shaft, a clutch carried thereby, a fixed jack shaft, connected gears rotatably and slidably mounted upon said jack shaft adapted to mesh with the gear carried by the follower shaft and the gear carried by the drive shaft for the transmission of motion between said drive and follower shaft gears, means for simultaneously moving said jack shaft connected gears and said drive shaft gear for the direct transmission of motion between said drive and follower shafts for the independent rotation of said drive shaft and for the transmission of motion between the said drive and follower shafts through said gears at a reduced speed, and means for locking the drive shaft and its gear together to hold the shifting parts in their several positions.

MUNRO S. BROWN.

Witnesses:
F. L. ANDREWS,
O. H. PARKER.